United States Patent [19]

Pruehs et al.

[11] Patent Number: 5,033,973
[45] Date of Patent: Jul. 23, 1991

[54] SERVICE DISCONNECT AND METER STORAGE ADAPTER

[75] Inventors: Allen V. Pruehs, Howell; Darrell Robinson, Highland; Robert O. Learmont, Walled Lake; Robert Goozen, St. Clair; Michael Lewis, Ann Arbor, all of Mich.

[73] Assignee: Ekstrom Industries, Inc., Farmington Hills, Mich.

[21] Appl. No.: 512,395

[22] Filed: Apr. 23, 1990

[51] Int. Cl.⁵ .......................................... H01R 29/00
[52] U.S. Cl. .................................. 439/167; 439/225; 439/517
[58] Field of Search ............... 439/508, 517, 167, 189, 439/225; 361/370–375

[56] References Cited

U.S. PATENT DOCUMENTS

| | | | |
|---|---|---|---|
| 3,150,289 | 9/1964 | Waldrop | 361/371 |
| 3,614,708 | 10/1971 | Koepfgen | 339/36 |
| 3,806,857 | 4/1974 | Hubeny | 339/19 |
| 4,162,516 | 7/1979 | Becker | 361/372 |
| 4,311,354 | 1/1982 | Robinson et al. | 339/36 |
| 4,744,004 | 5/1988 | Hammond | 361/372 |
| 4,892,485 | 1/1990 | Patton | 439/517 |

Primary Examiner—David L. Pirlot
Attorney, Agent, or Firm—Basile and Hanlon

[57] ABSTRACT

A service disconnect adapter mounted between a plug-in meter socket and a watthour meter. The service disconnect adapter has blades mounted on a base which engage terminals in the socket. Watthour blade receiving fingers are formed in the service disconnect adapter to receive and frictionally engage watthour meter blades. The service disconnect adapter electrically isolates the socket load terminals from the watthour meter blades to disconnect the watthour meter from the load side terminals of the socket. The blades are angularly offset from the watthour meter blade receiving fingers in the adapter to mount the watthour meter at an angle from its normal mounting position. A pair of electrically conductive jumpers are mounted on and extend through the base in the adapter and are electrically connectible between the socket line terminals and the selected ones of the watthour meter contact blades to connect electric power to the watthour meter while the watthour meter load contact blades are disconnected from the socket load terminals.

8 Claims, 2 Drawing Sheets

SERVICE DISCONNECT AND METER STORAGE ADAPTER

BACKGROUND OF THE INVENTION

This invention relates, in general, to electric watthour meters and, specifically, to watthour meter mounting devices.

In the electric utility industry, plug-in, socket-type watthour meters are commonly employed to measure electric power consumption at a residential or commercial building establishment. A cabinet is mounted on an outside wall of the residence or building and contains pairs of terminals which are connected to electric line and electric load conductors. The terminals receive blade contacts on a plug-in watthour meter to complete an electric circuit through the meter between the line and load terminals.

Frequently, it is necessary to disconnect electric power service to the residence or building. However, it is sometimes desirable in such situations, that the watthour meter be left in the cabinet for future service reconnection. Various adapters have been developed for this purpose.

U.S. Pat. No. 4,311,354 discloses such a meter disconnect adapter in the form of a plastic housing having outwardly extending blades which are insertable into the socket terminals in the cabinet. Resilient fingers are mounted within the adapter and receive the contact blades of a watthour meter to connect the meter to the adapter. The fingers are angularly offset from the blades in the adapter so as to mount the watthour meter at a 45° angle from its normal mounting position. This provides a visual indication that the meter is not in a normal operating position even though it is mounted in the socket.

With the introduction of electronic watthour meters utilizing programmable semiconductor memory for storing power usage, time-of-day usage, billing rates, etc., electric power must be maintained on the watthour meter at all times or cannot be interrupted for periods longer than the life of battery backup contained within the meter or the stored memory will be lost and reprogramming of the memory and recharging of the battery backup will be necessary.

Thus, it is desirable to provide a residential or building electrical service disconnect adapter which disconnects the socket line terminals from the socket load terminals when a watthour meter is stored in the adapter and socket; but which provides electric power through the adapter line terminals to power the semiconductor programmable memory and battery charging circuit contained within the watthour meter during storage. It would also be desirable to provide such a service disconnect adapter which provides a visual indication that the electrical service is disconnected while the meter is stored at the socket in the adapter.

SUMMARY OF THE INVENTION

The present invention is a service disconnect and meter storage adapter which is mounted between a plug-in watthour meter and a meter socket. The adapter provides electric power to certain terminals of the meter to provide electric power to a programmable semiconductor memory contained within the meter; while disconnecting electric power between the blades of the meter and the load terminals in the socket.

The service disconnect adapter includes a base and a peripheral wall extending from the base defining an internal cavity therebetween. A plurality of blades are mounted on the base and project outward from the base in a direction opposite from the interior cavity for engagement with the line and load terminals in a meter socket. Means are formed on the base on a surface opposite from the blades for receiving and frictionally engaging the contact blades of a watthour meter. Means are also provided for electrically insulating the blades on the base from the watthour meter contact blade receiving means. A pair of jumper means are mounted on and extend through the base for connecting electric power from the socket line terminals to selected ones of the watthour meter blades when the service disconnect adapter is mounted between the socket and the meter.

In a preferred embodiment, each jumper means comprises a conductive member extending through an aperture in the base and fixedly mounted on the adapter, such as on one surface of the base. Each conductive member has first and second ends, with the first end being engageable with one of the line terminals in the socket. The second end of each conductive member is connectible to one of the watthour meter blades when the watthour meter is plugged into the adapter.

The watthour meter blade receiving means preferably comprises a plurality of groups of resilient fingers mounted on the base and arranged to form a pair of intersecting slots in each group of fingers. Each of the slots is dimensioned to receive a meter contact blade in frictional engagement therewith. In a further preferred embodiment, the groups of resilient fingers are angularly offset from the blades on the base so as to mount the meter in the adapter at an angle from its normal mounting position to provide an indication that the meter, while mounted in the adapter and socket, is not in normal operation.

The means for electrically insulating the blades from the watthour meter contact blade receiving means or fingers may comprise the formation of the base, blades and resilient fingers from a plastic material. Further, the insulating means may comprise forming the base of a plastic material and angularly offsetting the groups of fingers from the blades on the base such that the watthour meter blades, when engaged in the adapter, are angularly offset and spaced from the blades on the adapter which engage the terminals in the socket.

The arrangement, shape and placement of the jumper means may be configured so as to adapt the service disconnect adapter of the present invention to any type of watthour meter having any blade pattern or number of blades.

The service disconnect adapter of the present invention uniquely provides power through the adapter to selected blades of the watthour meter to power components in the meter, such as a programmable semiconductor memory; while disconnecting the meter blades from the socket load terminals. This retains the memory in the meter in its operative state even though the meter is not mounted in a normal operating position on the adapter. Further, the offset positioning of the resilient fingers in the adapter causes the meter to be mounted in an angularly offset position from its normal mounting position to provide a visual indication that the meter is not in a normal operating position while mounted in the adapter and socket. Further, the adapter can be made of a visually indicative color, such as red, for example, to provide a further visual indication that the meter is not in a normal operating position while mounted in the socket.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
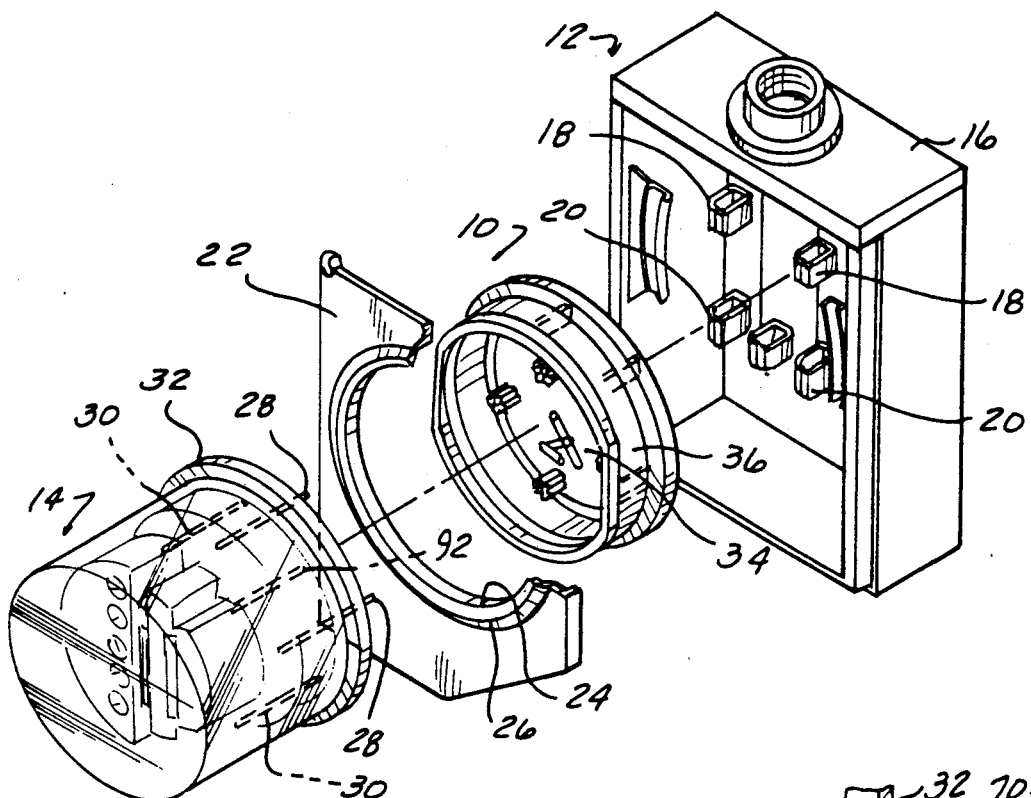
FIG. 1 is an exploded, perspective view of a service disconnect and meter storage adapter of the present invention shown in an assembly position between a watthour meter and a meter socket.

Throughout the following description and drawing, an identical reference number is used to refer to the same component shown in multiple figures of the drawing.

Referring now to the drawing, and to FIG. 1 in particular, there is illustrated a service disconnect and meter storage adapter 10 constructed in accordance with the teachings of the present invention which is removably insertable into a meter socket 12 and which receives a conventional electric watthour meter 14.

The socket 12 may be of either the ring or ringless type, with a ringless socket 12 being shown by way of example only. The socket 12 includes a cabinet or housing 16 which is typically mounted on the outside wall of a residential or commercial building establishment. The cabinet 16 contains a first pair of line terminals 18 which are connected to incoming electric power line conductors, not shown, and a second pair of load terminals 20 which are connected to the residential building electrical conductors. The cabinet 16 includes a removable cover 22 which contains a central aperture 24 having a peripheral, outwardly extending flange 26 formed thereabout.

The line and load terminals 18 and 20 in the socket housing 16 are adapted to normally receive corresponding line contact blades 28 and load contact blades 30, respectively, of a conventional electric watthour meter 14. With the cover 22 of the housing 16 temporarily opened or removed from the housing 16, the meter 14 would be inserted into the housing 16 such that the line and load blades 28 and 30 on the meter 14 respectively engage the pairs of line and load terminals 18 and 20 in the socket housing 16.

When it is necessary to temporarily disconnect electric service from the residential building, it is oftentimes desirable to maintain the watthour meter 14 in the socket 16. In this situation, the service disconnect adapter 10 is inserted between the meter 14 and the socket 16. In a preferred embodiment, the service disconnect adapter 10 of the present invention is formed of a single-piece, molded plastic body having a base 34, and a peripheral wall 36 surrounding and extending from the base 34 and having an open end defining an internal cavity therebetween. For a clear indication that the adapter 10 is mounted in the socket 12, the adapter 10 may be provided in a particular color, i.e. red; thus, the adapter 10 is readily visible from any viewing angle to indicate that the meter is not in a normal operating position.

Figure 2:
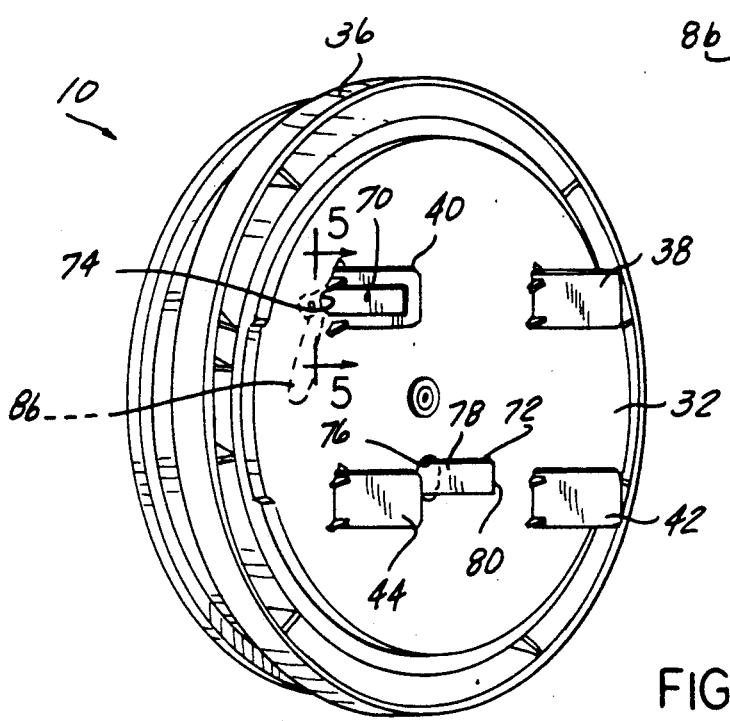
FIG. 2 is a perspective view of the back wall of the service disconnect adapter of the present invention.
Figure 3:
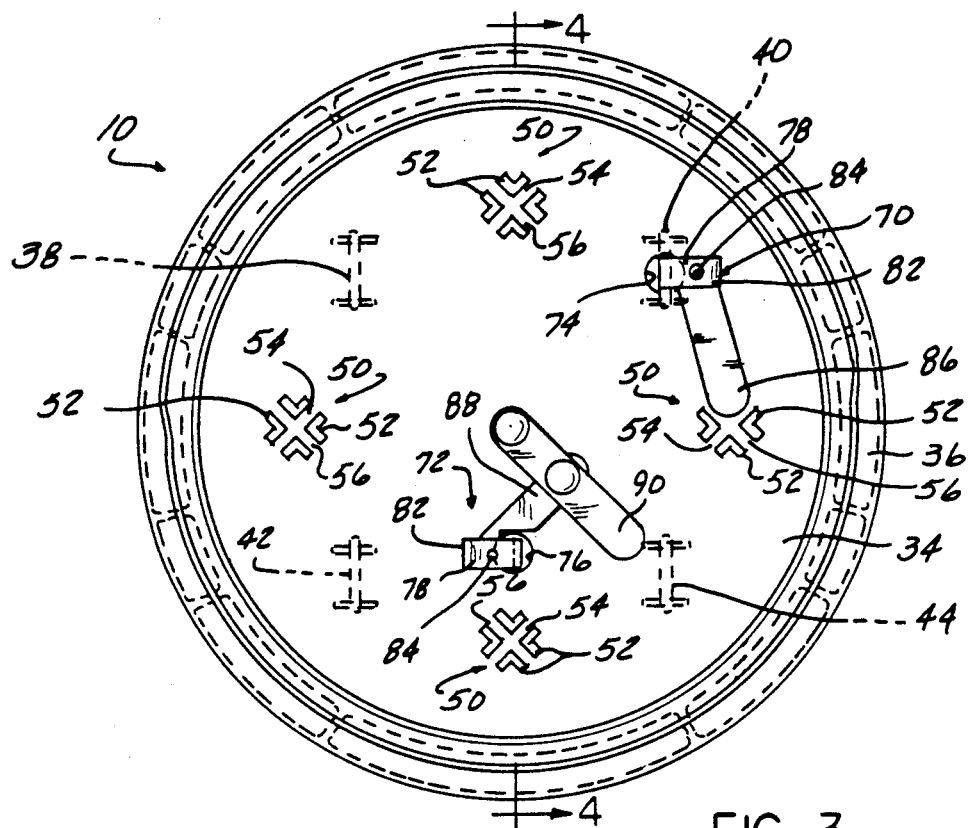
FIG. 3 is a front elevational view of the service disconnect adapter shown in FIGS. 1 and 2.
Figure 4:
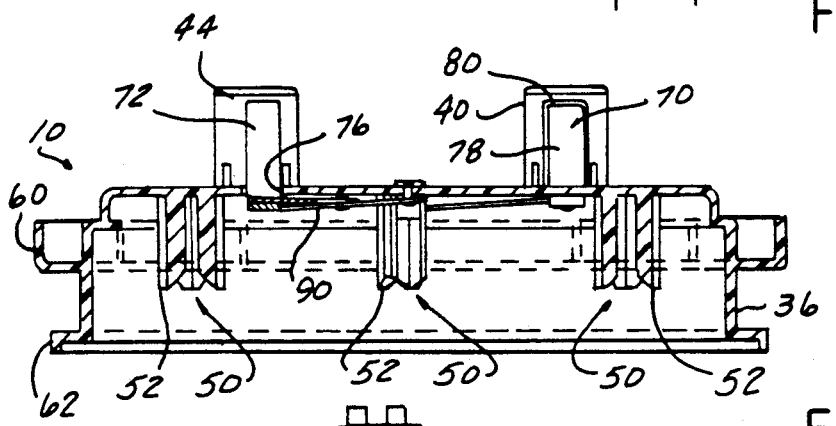
FIG. 4 is a cross-sectional view generally taken along line 4—4 in FIG. 3.

As shown more clearly in FIGS. 2, 3 and 4, a plurality of blades are mounted on the base 34 of the service disconnect adapter 10 and extend outward from one surface of the base 34. In an embodiment of the service disconnect adapter 10 designed for single phase meter usage, the service disconnect adapter 10 is provided with a first pair of line contact blades 38 and 40 and a second pair of load contact blades 42 and 44. The blades 38, 40, 42 and 44 are preferably integrally formed with the base 34 from a molded plastic.

The blades 38, 40, 42 and 44 are sized, shaped and positioned to simulate the contact blades 28 and 30 of the watthour meter 14. Thus, the blades 38, 40, 42 and 44 are respectively engageable with the pairs of line and load terminals 18 and 20 in the socket housing 16 to mount the service disconnect adapter 10 in the socket housing 16.

Since the function of the service disconnect adapter 10 of the present invention is to electrically disconnect the load terminals 20 of the socket 12 from the load terminals 30 of the meter 14, it is preferred that the base 34 and the blades 38, 40, 42 and 44 mounted thereon be formed of an electrically insulating, plastic material. However, the blades on the base 34 may be formed of metal and other means provided for electrically insulating such blades from the watthour meter 14, as described below.

As shown in FIGS. 3 and 4, means are formed on the base 34 on a surface opposite from the contact blades 38, 40, 42 and 44 for receiving and frictionally engaging the contact blades 28 and 30 of a watthour meter 14. Such means comprise a plurality of groups 50 of resilient fingers 52. Each finger 52 is generally V-shaped with the apexes pointing towards a common central point, forming two intersecting slots 54 and 56 in each group 50 of fingers 52. The groups 50 of fingers 52 are preferably molded integrally with the base 34 and are surrounded within the peripheral wall 36 of the adapter 10.

Further, in a preferred embodiment, the groups 50 of fingers 52 are angularly offset from the contact blades 38, 40, 42 and 44 on the base 34 so as to be non-aligned with such blades, as shown in FIG. 3. Since the base 34 is formed of an electrically insulating plastic material, this electrically insulates the groups 50 of fingers 52 from the blades 38, 40, 42 and 44. In this manner, insertion of the contact blades 28 and 30 of a watthour meter 14 into the groups 50 of fingers 52 separates and insulates such blades 28 and 30 from the blades 38, 40, 42 and 44 on the adapter 10 which is mounted in the terminals 18 and 20 of the socket 12.

Figure 6:
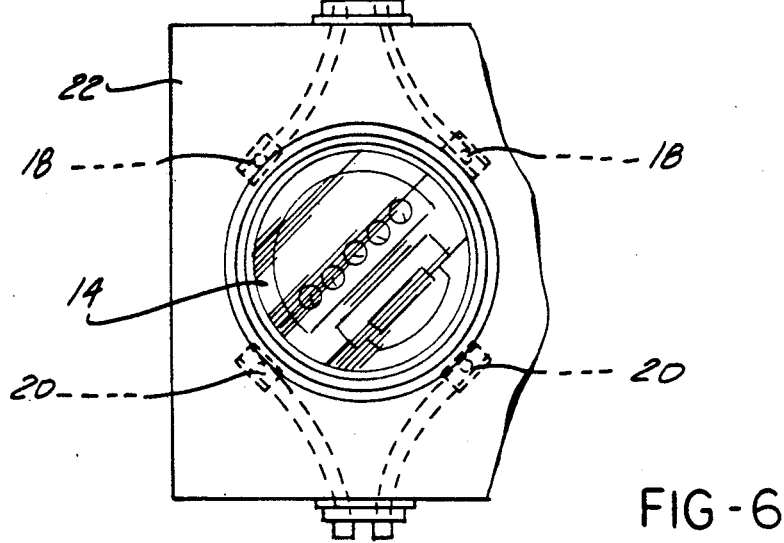
FIG. 6 is a front elevational view of the assembly of FIG. 1 showing the mounted position of a watthour meter in the service disconnect adapter of the present invention.

Further, this mounting arrangement of the groups 50 of fingers 52 causes the meter 14 to be disposed at an angle from its normal mounting orientation in the socket, as shown in FIGS. 1 and 6 and described in greater detail hereafter.

The peripheral wall 36 on the service disconnect adapter 10, as shown in FIG. 4, is provided with a radially extending bearing flange 60 at one end which has a radial size substantially the same as that of a mounting flange 32 on the watthour meter 14 so that the adapter 10 can be mounted in the socket cabinet 16 in the same manner as a meter 14.

The other end of the peripheral wall 36 terminates in an outwardly turned mounting flange 62. The flange 62 has an overall diameter slightly less than that of the meter flange 32 to enable it to pass through the aperture 24 in the cover 22, yet is large enough to be engaged by a meter clamping ring, not shown, which surrounds the flanges 62 and 32 to clamp the meter 14 to the adapter 10. A seal tab may be used with the clamp ring to provide an indication of tampering.

In using the service disconnect adapter 10 of the present invention, the adapter 10 is initially installed in the socket 12 by frictionally engaging the blades 38, 40, 42 and 44 on the base 34 of the adapter 10 in the pairs of line and load terminals 18 and 20 of the socket 12. The watthour meter 14 is then mounted in the service disconnect adapter 10 by engaging the line and load blades 28 and 30 of the watthour meter 14 with the slots 54 or 56 in the groups 50 of fingers 52 in the adapter 10. The angular position of the groups 50 of fingers 52 in the service disconnect adapter 10 causes the watthour meter 14 to be disposed at an angle from its normal mounting position, as shown in FIGS. 1 and 6. This provides a readily visible indication that the meter 14, while mounted in the socket 12, is not in a normal operating position.

A unique feature of the service disconnect adapter 10 is the potential pass through which connects electric power from the socket line terminals 18 to selected blades 28 and 30 on the meter 14 for powering on-board programmable semiconductor memory and battery backup recharging circuits contained within the watthour meter 14. However, the load terminals 20 in the socket 12 are disconnected through the adapter 10 from the load terminals 30 in the meter 14 thereby disconnecting electric power to the building on which the socket 12 is mounted.

Figure 5:
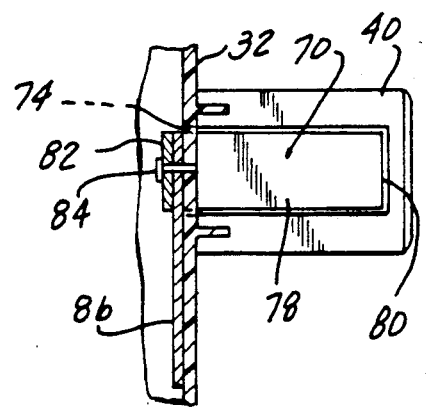
FIG. 5 is a cross-sectional view generally taken along line 5—5 in FIG. 2.

The potential pass through feature is provided by a pair of jumper means 70 and 72 which are mounted on and extend through the base 34 in the service disconnect adapter 10, as shown in FIGS. 2-5. The jumper means 70 and 72 include apertures 74 and 76, respectively, which are formed in the base 32. Each jumper means 70 and 72 includes a metallic, electrically conductive member or strip 78 having a first end 80 and a second end 82. The first end 80 of the conductive strip or member 78 is sized and configured to be slidingly and frictionally engageable with one of the line terminals 18 in the socket 12. The second end 82 of each conductive member 78 extends through the respective aperture 74 or 76 in the base 34 of the service disconnect adapter 10 and is bent at a perpendicular angle to extend parallel to the base 34, as shown in FIG. 5. The second end 82 of the conductive member 78 thus overlies the surface of the base 34 within the interior cavity formed by the peripheral wall 36 and the base 34. A suitable fastening means, such as a rivet or screw fastener 84, extends through the second end 82 of each conductive member 78 and the base 34 to attach the conductive member 78 to the base 34.

An elongated, thin conductive tab 86 is connected to and extends from the second end 82 of the conductive member 78 and forms the jumper means 70. In one embodiment shown in FIG. 3, the conductive tab 86 extends from the jumper 70 into proximity with a group 50 of fingers 52 so as to electrically engage the contact blade 30 of the meter 14 when the meter 14 is mounted in the service disconnect adapter 10. This provides an electrical connection through the first jumper 70 from the line terminal 18 in the socket 12 to the watthour meter contact blade 30.

The second jumper 72 also includes a thin conductive tab 88 fastened at one end and extending from the conductive strip 78. In an illustrative and exemplary embodiment shown in FIG. 3, an additional conductive tab 90 is joined to and extends from one end of the conductive tab 88. The outer or terminal end of the conductive member 90 is disposed in proximity with a central tap terminal 92 normally mounted on single phase watthour meters 14 and positioned between the load contact blades 30, as shown in FIG. 4. This completes the electrical circuit between the jumpers 70 and 72 and the watthour meter blades 30 and 92 to provide electrical power to the on-board electronic components housed within the watthour meter 14 which require a continuous application of electric power for proper operation. However, since the watthour meter load blades 30 are electrically disconnected from the socket load terminals 20, electric power is disconnected between the line and load terminals of the socket 12 so as to prevent the application of electric power to the building conductors.

It will be understood that the specific number and position of the jumper means 70 and 72 is illustrated by way of example only. Other configurations depending upon the specific blade arrangement on a watthour meter 14 may also be employed to connect electric power to on-board electronic components housed within such watthour meters 14.

In summary, there has been disclosed a unique service disconnect and meter storage adapter which provides continuous electric power to certain blades of the watthour meter for powering electronic components housed within the watthour meter; yet disconnects electric power between the socket line and load terminals when the service disconnect adapter is mounted between the watthour meter and the meter socket. Pairs of jumpers are mounted in the service disconnect adapter and connected between selected ones of the socket line terminals and the meter line or load blades to provide a continuous electric circuit therebetween. However, both load blades of the watthour meter are electrically disconnected from the load terminals of the socket to disconnect the meter from the socket and prevent the application of electric power to the building power conductors to which the electric socket is connected.

What is claimed is:

1. A service disconnect adapter for assembly into an electric meter socket having line and load terminals in place of a watthour meter having a plurality of line and load contact blades, the service disconnect adapter comprising:

a base and a peripheral wall extending from the base and defining an internal cavity therebetween;

a plurality of blades mounted on the base and projecting outward from the base in a direction opposed from the interior cavity for engagement with the line and load terminals in the meter socket;

means formed on the base on a surface opposite from the blades for receiving and frictionally engaging the line and load contact blades of a watthour meter;

means for electrically insulating the blades on the base from the watthour meter contact blade receiving means; and a pair of electrically conductive jumper means, mounted on and extending through the base, for connecting electric power from selected ones of the socket line terminals to selected ones of the watthour meter contact blades when the adapter is mounted between the meter socket and the watthour meter and all of the watthour meter load contact blades are electrically disconnected from the socket load terminals.

2. The service disconnect adapter of claim 1 wherein each jumper means comprises:
an aperture formed in the base;
a conductive member extending through the aperture in the base and fixedly mounted on the adapter, the conductive member having first and second ends, with the first end being engageable with one of the line terminals in the meter socket and the second end being connectible to one of the watthour meter contact blades when the watthour meter is plugged into the adapter.

3. The service disconnect adapter of claim 1 wherein the means for receiving the contact blades of the watthour meter comprises:
a plurality of groups resilient fingers mounted on the base and arranged to form in each group a pair of intersecting slots, each of the slots being dimensioned to receive a watthour meter contact blade in frictional engagement therewith.

4. The service disconnect adapter of claim 1 wherein the insulating means comprises:
the base formed of an electrically insulating material, the base disposed between and electrically insulating the blades on the base from the watthour meter blade receiving means.

5. The service disconnect adapter of claim 1 wherein:
one of the jumper means extends through the base and is directly engageable with one of the meter line socket terminals.

6. A service disconnect adapter for assembly into an electric meter socket having line and load terminals in place of a watthour meter having a plurality of line and load contact blades, the service disconnect adapter comprising:
a base and a peripheral wall extending from the base and defining an internal cavity therebetween;
a plurality of blades mounted on the base and projecting outward from the base in a direction opposed from the interior cavity for engagement with the line and load terminals in the meter socket;
means formed on the base on a surface opposite from the blades for receiving and frictionally engaging the line and load contact blades of a watthour meter, the receiving means including a plurality of groups of resilient fingers mounted on the base and arranged to form in each group a pair of intersecting slots, each of the slots being dimensioned to receive a watthour meter contact blade in frictional engagement therewith;
means for electrically insulating the blades on the base from the watthour meter contact blade receiving means, the insulating means including the base formed of an electrically insulating material;
the groups of fingers being angularly offset from the blades on the base such that the orientation of a watthour meter engaged with the groups of fingers is different from the normal mounting position of the watthour meter in the meter socket; and
a pair of jumper means, mounted on and extending through the base, for connecting electric power from of the socket line terminals to selected ones of the watthour meter contact blades when the adapter is mounted between the meter socket and the watthour meter.

7. A service disconnect adapter for assembly into an electric meter socket having line and load terminals in place of a watthour meter having a plurality of line and load contact blades, the service disconnect adapter comprising:
a base and a peripheral wall extending from the base and defining an internal cavity therebetween;
a plurality of blades mounted on the base and projecting outward from the base in a direction opposed from the interior cavity for engagement with the line and load terminals in the meter socket, at least one of the blades on the base having a hollow, open-sided cavity formed therein;
means formed on the base on a surface opposite from the blades for receiving and frictionally engaging the line and load contact blades of a watthour meter;
means for electrically insulating the blades on the base from the watthour meter contact blade receiving means; and
a pair of jumper means, mounted on and extending through the base, for connecting electric power from of the socket line terminals to selected ones of the watthour meter contact blades when the adapter is mounted between the meter socket and the watthour meter, one of the jumper means being disposed within the cavity to electrically engage a meter socket terminal when the service disconnect adapter is mounted in the meter socket.

8. A service disconnect adapter for assembly into electric meter socket having line and load terminals in place of a watthour meter having a plurality of line and load contact blades, the service disconnect adapter comprising:
a base and a peripheral wall extending from the base and defining an internal cavity therebetween, the base and the peripheral wall formed of a molded plastic material;
a plurality of blades mounted on the base and projecting outward from the base in a direction opposed from the interior cavity for engagement with the line and load terminals in the meter socket;
a plurality of groups of resilient fingers mounted on the base and arranged to form in each group a pair of intersecting slots, each of the slots being dimensioned to receive a watthour meter contact blade in frictional engagement therewith, the groups of fingers being angularly offset from the blades on the base such that the orientation of a watthour meter engaged with the groups of fingers is different from the normal mounting position of the watthour meter in the meter socket;
means for electrically insulating the blades on the base from the watthour meter contact blade receiving means; and
a pair of jumper means, mounted on and extending through the base, for connecting electric power from the socket line terminals to selected ones of the watthour meter contact blades when the adapter is mounted between the meter socket and the watthour meter, each jumper means including:
an aperture formed in the base; and a conductive member extending through the aperture in the base and fixedly mounted on the adapter, the conductive member having first and second ends, with the first end being engageable with one of the line terminals in the meter socket and the second end being connectible to one of the watthour meter contact blades when the watthour meter is plugged into the adapter.

* * * * *